United States Patent
Yu et al.

(10) Patent No.: US 11,479,714 B2
(45) Date of Patent: Oct. 25, 2022

(54) PROFILE CONTROL AND OIL DISPLACEMENT AGENT FOR OIL RESERVOIR AND PREPARATION METHOD THEREOF

(71) Applicant: Yangtze University, Jingzhou (CN)

(72) Inventors: Xiaorong Yu, Jingzhou (CN); Huan Yang, Jingzhou (CN); Gaoshen Su, Jingzhou (CN); Wei Wang, Jingzhou (CN)

(73) Assignee: Yangtze University, Jingzhou (CN)

( * ) Notice: Subject to any disclaimer, the term of this patent is extended or adjusted under 35 U.S.C. 154(b) by 0 days.

(21) Appl. No.: 17/341,528

(22) Filed: Jun. 8, 2021

(65) Prior Publication Data

US 2022/0064517 A1  Mar. 3, 2022

(30) Foreign Application Priority Data

Jun. 8, 2020 (CN) .......................... 202010510772.5

(51) Int. Cl.
*C09K 8/512* (2006.01)
*C09K 8/588* (2006.01)

(52) U.S. Cl.
CPC .................................. *C09K 8/588* (2013.01)

(58) Field of Classification Search
CPC .... C09K 8/588; C09K 2208/10; C09K 8/035; C09K 8/508; C09K 8/512; C09K 8/516; C09K 8/5083; C09K 8/882; C08F 2/44; C08F 220/56; C08F 283/065; C08K 3/22; C08K 7/26; C08K 2003/2241
See application file for complete search history.

(56) References Cited

FOREIGN PATENT DOCUMENTS

| CN | 101353571 A | * | 1/2009 |
| CN | 106589229 A | * | 4/2017 |
| CN | 110922951 A | * | 3/2020 |

* cited by examiner

*Primary Examiner* — Kumar R Bhushan
(74) *Attorney, Agent, or Firm* — Troutman Pepper Hamilton Sanders LLP; Christopher C. Close, Jr.

(57) ABSTRACT

The present disclosure relates to a profile control and oil displacement agent for an oil reservoir and a preparation method thereof. The profile control and oil displacement agent is prepared by uniformly dispersing polymer microspheres, an activator and a solvent. The polymer microspheres are micron-sized dry-powdered microspheres, which are prepared by stirring and polymerizing a first monomer, a second monomer, an initiator, a hydrophobic nano-powder and water in a specific proportion. The profile control and oil displacement agent of the present disclosure can reduce the oil-water interfacial tension, has good long-term stability, simple preparation and low cost, avoids solvent waste, and can be applied to the deep profile control and oil displacement system of oil fields.

15 Claims, 4 Drawing Sheets

PROFILE CONTROL AND OIL DISPLACEMENT AGENT FOR OIL RESERVOIR AND PREPARATION METHOD THEREOF

CROSS REFERENCE TO RELATED APPLICATIONS

This application claims priority, and benefit under 35 U.S.C. § 119(e) of Chinese Patent Application No. 202010510772.5 filed 8 Jun. 2020. The disclosure of the prior application is hereby incorporated by reference as if fully set forth below.

TECHNICAL FIELD

The present disclosure relates to the field of oilfield exploitation, in particular to a profile control and oil displacement agent for an oil reservoir and a preparation method thereof.

BACKGROUND

As conventional high-recovery, high-quality oil reservoirs are exhausted, the development of unconventional oil and gas resources, especially low-permeability oil and gas reservoirs, has become a current research hotspot. At present, the major development technology for low-permeability oil reservoirs is still water flooding. Low-permeability oil reservoirs are characterized by complex pore structure, narrow throats, well-developed fractures and micro-fractures and serious heterogeneity. Their waterflooding development effect is not ideal, which is essentially manifested by low single-well productivity, fast production decline, high water injection pressure, early water breakthrough, rapid rise of water cut, and even serious water channeling, resulting in low oil recovery (less than 25%). According to the reservoir and development characteristics of low-permeability oil reservoirs, it is necessary to solve the problems of water channeling and remaining oil drive to improve the recovery of low-permeability oil reservoirs.

In recent years, the polymer microsphere-based deep profile control and oil displacement technology has achieved excellent water control and oil enhancement effects in low-permeability oil reservoirs, but there are still the following shortcomings:

(1) Conventional polymer microspheres have low strength. Compared with conventional oil reservoirs, low-permeability oil reservoirs have lower permeability and higher displacement pressure. To achieve high-efficiency plugging, the polymer microspheres must have sufficient pressure-bearing capacity, which requires high strength of the polymer microspheres themselves. However, the conventional polymer microspheres have low strength and are easy to shear and break, especially after water swelling.

(2) Conventional polymer microspheres have high preparation costs. Conventional polymer microspheres are essentially prepared by inverse suspension polymerization, inverse emulsion polymerization or inverse micro-emulsion polymerization. The preparation system is complex in composition, and requires a large amount of organic solvents (continuous phase) and emulsifiers, yielding high preparation costs. In addition, most organic solvents and emulsifiers cannot be recycled, resulting in waste.

(3) Conventional polymer microspheres have low oil displacement efficiency. After the conventional polymer microsphere dispersions enter the formation, the swept area expands, and the unswept remaining oil is displaced by the water in the microsphere dispersion system, achieving the effect of synchronous profile control and oil displacement. However, as the matrix of the low-permeability oil reservoir is dense, a higher pressure gradient is required to drive the remaining oil in the tight zone. In actual production, the increasing injection pressure provided by the water injection pipeline network is limited, and the pressure-bearing capacity of the plugging section of the high-permeability layer is also limited, resulting in the limited displacement effect of the conventional polymer microsphere dispersion system.

SUMMARY

In view of this, the present disclosure provides a profile control and oil displacement agent for an oil reservoir and a preparation method thereof. The profile control and oil displacement agent can improve oil displacement efficiency, and has a good plugging effect and a low preparation cost.

The present disclosure provides a profile control and oil displacement agent for an oil reservoir, which is essentially prepared by uniformly dispersing components by weight percent as follows:

0.2-1.0% polymer microspheres;
0.2-0.5% activator; and
the balance being a dispersant;

where, the polymer microspheres are essentially prepared by stirring and polymerizing raw materials in part by weight as follows: 10-40 parts of first monomer, 0.05-1.2 parts of second monomer, 0.03-1.5 parts of initiator, 1-12 parts of hydrophobic nano-powder and 65-85 parts of water; the first monomer is selected from at least one of the group consisting of acrylamide monomer, allyl monomer, styrene monomer, itaconic acid and maleic anhydride; the second monomer is a crosslinking monomer.

Preferably, the polymer microspheres are essentially prepared by stirring and polymerizing raw materials in part by weight as follows: 12-35 parts of first monomer, 0.05-1.0 parts of second monomer, 0.04-0.2 parts of initiator, 2-10 parts of hydrophobic nano-powder and 70-80 parts of water In some embodiments, a weight ratio of the main activator to the auxiliary activator is (0.1-0.5):(0.01-0.08).

In some embodiments, the hydrophobic nano-powder is selected from at least one of the group consisting of hydrophobic nano-$SiO_2$ and hydrophobic nano-$TiO_2$.

In some embodiments, the first monomer is selected from at least one of the group consisting of acrylamide, 2-methyl-2-acrylamido-propanesulfonic acid, sodium methallylsulfonate, methacryloxyethyl trimethyl ammonium chloride, sodium p-styrene sulfonate, dimethyl diallyl ammonium chloride, itaconic acid, acrylic acid and maleic anhydride.

In some embodiments, the second monomer is selected from at least one of the group consisting of N,N-methylenebisacrylamide, divinylbenzene, 1,4-butanediol dimethacrylate, ethylene glycol dimethacrylate and polyethylene glycol diacrylate; where, the polyethylene glycol diacrylate is preferably selected from at least one of the group consisting of polyethylene glycol diacrylate (PEGDA 200), polyethylene glycol diacrylate (PEGDA 400) and polyethylene glycol diacrylate (PEGDA 600).

In some embodiments, the initiator is selected from at least one of the group consisting of ammonium persulfate, sodium persulfate, potassium persulfate, sodium thiosulfate, sodium bisulfate and 2,2'-azobis[2-methylpropanamidine] dihydrochloride.

The present disclosure further provides a preparation method for the profile control and oil displacement agent for an oil reservoir, including the following steps: weighing each raw material according to the composition of the polymer microspheres; adding the first monomer, the second monomer, the initiator and the hydrophobic nano-powder to the water, stirring at a high speed to generate a dry mixed powder; polymerizing to produce polymer microspheres; and uniformly dispersing the polymer microspheres and the activator in a solvent.

In some embodiments, the step for generating the dry mixed powder is performed by stirring at 3000 r/min to 20000 r/min for 0.5 min to 5 min, and the high-speed stirring may be carried out with a corrugated stirrer or a high-shear emulsifier; the polymerizing is performed at 25° C. to 70° C.

The present disclosure prepares the polymer microspheres by a "liquid-in-solid" micro-reactor method.

The present disclosure adopts a mixed system of monomer aqueous solution and hydrophobic nano-powder. Under high-speed stirring, the monomer aqueous solution is sheared into small droplets (tens of microns). The hydrophobic nano-powder is adsorbed on an interface between the monomer droplets and air by a hydrophobic force to form a coating to wrap the droplets. The nano-powder coating prevents particles from agglomerating, prevents the internal liquid from overflowing, and provides a stable microenvironment for the chemical reaction of the internal liquid. When a decomposition temperature of the initiator reaches, a polymerization reaction occurs, and micron-sized dry-powdered polymer microspheres are produced. The polymer microsphere has a unique core-shell structure, in which an outer shell is the hydrophobic nano-powder and an inner core is an elastically deformable hydrogel, giving the microspheres specific strength.

The present disclosure has the following advantages:

(1) The profile control and oil displacement agent of the present disclosure can be directly injected into the formation of a low-permeability oil reservoir by uniformly dispersing the polymer microspheres with a unique core-shell structure and the activator in water, thereby solving the water channeling problem of the low-permeability oil reservoir. It can greatly reduce the oil-water interfacial tension, improve oil stripping efficiency, and drive the remaining oil in the low-permeability oil reservoir under a low displacement pressure gradient to improve oil displacement efficiency.

(2) The polymer microspheres used by the profile control and oil displacement agent of the present disclosure are dry-powdered microspheres. They are prepared by compounding the first monomer, the second monomer, the initiator, the hydrophobic nano-powder and the water in a specific proportion and then directly stirring and polymerizing. Compared with polymer microspheres prepared by conventional methods such as inverse emulsion polymerization, inverse suspension polymerization and inverse micro-emulsion polymerization using emulsifiers and a large amount of organic solvents, the polymer microspheres of the present disclosure have high strength and a simple preparation process, and can significantly save the overall preparation cost.

DETAILED DESCRIPTION

The principles and features of the present disclosure are described below with reference to the accompanying drawings. The listed embodiments only serve to explain the present disclosure, rather than to limit the scope of the present disclosure. Unless defined otherwise, all technical and scientific terms mentioned herein have the same meanings as commonly understood by those of ordinary skill in the technical field to which the present disclosure belongs. The terms mentioned herein are merely for the purpose of describing specific embodiments, rather than to limit the present disclosure.

Test Materials:

2-methyl-2-acrylamido-propanesulfonic acid, purchased from Shouguang City Songchuan Industrial Additives Co., Ltd.;

methacryloxyethyl trimethyl ammonium chloride and N,N-methylenebisacrylamide, purchased from Aladdin;

ethylene glycol dimethacrylate, purchased from Jinan Jinrihe Chemical Co., Ltd.;

1,4-butanediol dimethacrylate, with a content of 99.0%, purchased from Fushun Anxin Chemical Co., Ltd.;

polyethylene glycol diacrylate (PEGDA 200), purchased from Guangzhou Liguo Trading Co., Ltd.;

SR380 fumed $SiO_2$, with an average particle size of 7 nm and a specific surface area of 360±20 $m^2/g$, purchased from Guangzhou Shenna Trading Co., Ltd.; R972 fumed $SiO_2$, with an average particle size of 16 nm and a specific surface area of 110±20 $m^2/g$, purchased from Evonik Industries AG; hydrophobic $TiO_2$, with an average particle size of 30 nm, purchased from Xuancheng Jingrui New Material Co., Ltd;

the rest are conventional reagents which are commercially available.

Embodiment 1

This embodiment provides a preparation method of a profile control and oil displacement agent, including the following steps:

(1) Preparation of Polymer Microspheres:

Weigh 20 g acrylamide, 5 g 2-methyl-2-acrylamido-propanesulfonic acid, 0.5 g N,N-methylenebisacrylamide, 4 g SR380 fumed $SiO_2$, 0.06 g ammonium persulfate and 0.048 g sodium bisulfite; add them to a beaker with 70 g distilled water; stir a mixed liquor at 15000 r/min for 100 s to generate a dry mixture; place the dry mixture in a 35° C. water bath environment for 2 h to obtain a dry-powdered polymer microsphere product.

(2) Preparation of Dispersion System:

Sequentially weigh 0.3 g polymer microspheres prepared in step (1), 0.25 g APG1214 and 0.05 g n-octanol; add them to 100 g water, stir and disperse uniformly.

Figure 1:
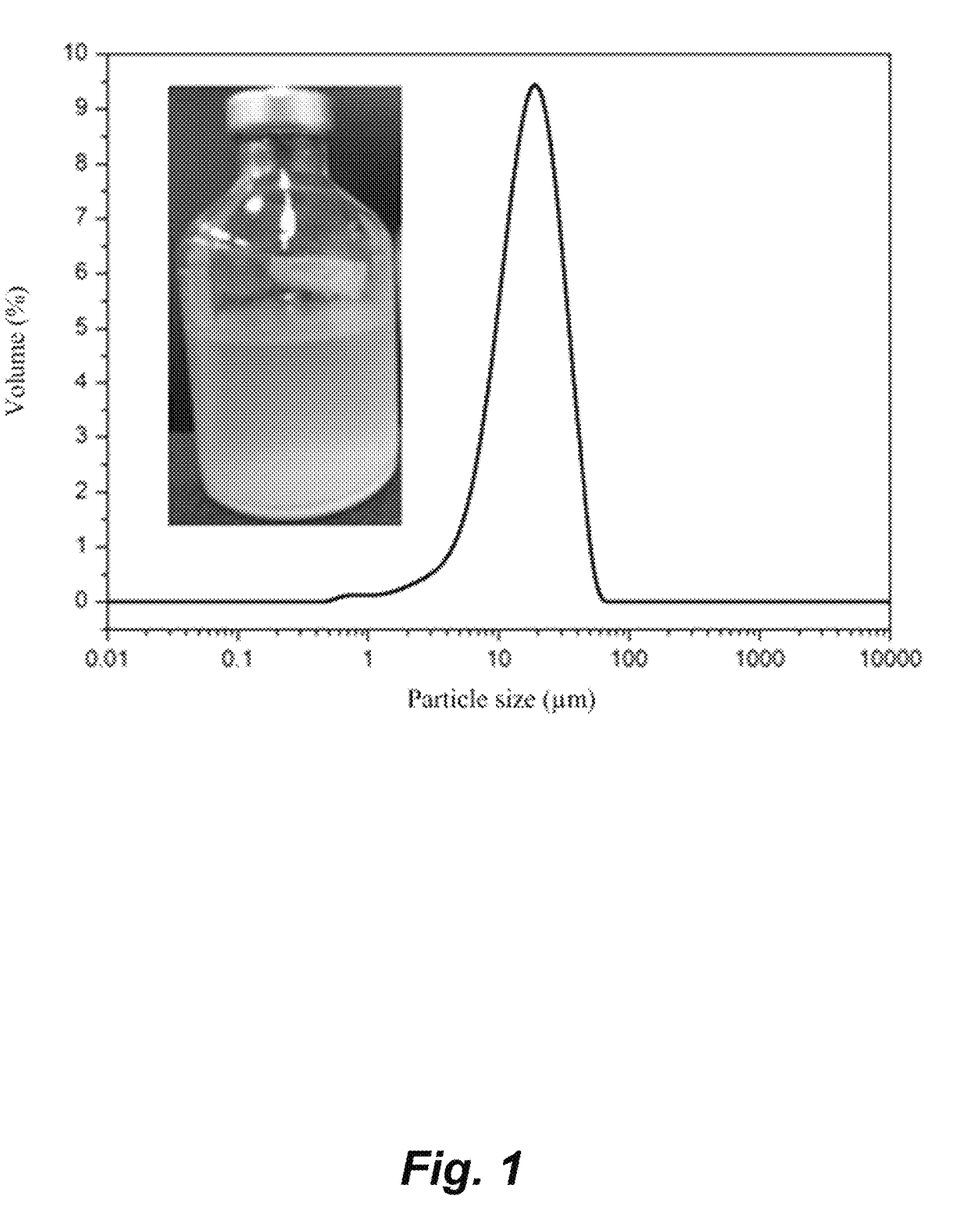
FIG. 1 shows a photograph and a tested particle size of a profile control and oil displacement agent prepared in Embodiment 1.

The photograph and particle size (average 18.2 μm) of the profile control and oil displacement agent prepared in this embodiment are shown in FIG. 1.

Embodiment 2

This embodiment provides a preparation method of a profile control and oil displacement agent, including the following steps:

(1) Preparation of Polymer Microspheres:

Weigh 15 g acrylamide, 2 g itaconic acid, 0.1 g N,N-methylenebisacrylamide, 2 g SR380 fumed $SiO_2$, 0.03 g ammonium persulfate and 0.024 g sodium bisulfite; add them to a beaker with 80 g distilled water; stir a mixed liquor of step 51 at 3000 r/min for 5 min to generate a dry-powdered mixture; place the dry mixture in a 35° C. water bath environment for 2 h to obtain a dry-powdered polymer microsphere product.

(2) Preparation of Dispersion System:

Sequentially weigh 0.3 g polymer microspheres prepared in step (1), 0.2 g petroleum sulfonate and 0.03 g n-octanol; add them to 100 g water, stir and disperse uniformly.

Embodiment 3

This embodiment provides a preparation method of a profile control and oil displacement agent, including the following steps:

(1) Preparation of Polymer Microspheres:

Weigh 25 g acrylamide, 5 g methacryloxyethyl trimethyl ammonium chloride, 0.3 g N,N-methylenebisacrylamide, 5 g R972 fumed $SiO_2$ and 0.045 g ammonium persulfate; add them to a beaker with 70 g distilled water; stir a mixed liquor of step 51 at 10000 r/min for 150 s to generate a dry-powdered mixture; place the dry-powdered mixture in a 65° C. water bath for polymerization for 3 h to obtain dry polymer microspheres.

(2) Preparation of Dispersion System:

Sequentially weigh 0.7 g polymer microspheres prepared in step (1), 0.2 g hydroxy-2-undecyl-1-carboxymethylimidazoline and 0.05 g isoamyl alcohol; add them to 100 g water, stir and disperse uniformly.

Embodiment 4

This embodiment provides a preparation method of a profile control and oil displacement agent, including the following steps:

(1) Preparation of Polymer Microspheres:

Sequentially weigh 20 g acrylamide, 3 g sodium p-styrene sulfonate, 0.7 g N,N-methylenebisacrylamide, 7 g hydrophobic $TiO_2$ and 0.1 g ammonium persulfate; add them to a beaker with 75 g distilled water; stir a mixed liquor of step 51 at 15000 r/min for 50 s to generate a dry-powdered mixture; place the dry-powdered mixture in a 65° C. water bath for polymerization for 2 h to obtain dry polymer microspheres.

(2) Preparation of Dispersion System:

Sequentially weigh 0.3 g polymer microspheres prepared in step (1), 0.15 g sodium dodecylbenzene sulfonate and 0.08 g of glycerol; add them to 100 g water, stir and disperse uniformly.

Embodiment 5

This embodiment provides a preparation method of polymer microspheres, including the following steps:

(1) Preparation of Polymer Microspheres:

Sequentially weigh 10 g acrylamide, 10 g itaconic acid, 10 g maleic anhydride, 0.7 g 1,4-butanediol diacrylate, 4 g R972 fumed $SiO_2$, 0.05 g potassium persulfate and 0.1 g sodium bisulfate; add them to a beaker with 75 g distilled water to generate a mixed liquor; stir the mixed liquor of step S1 at 15000 r/min for 50 s to generate a dry-powdered mixture; place the dry-powdered mixture in a 30° C. water bath for polymerization for 2 h to obtain polymer microspheres.

(2) Preparation of Dispersion System:

Sequentially weigh 0.3 g polymer microspheres prepared in step (1), 0.2 g petroleum sulfonate and 0.03 g n-octanol; add them to 100 g water, stir and disperse uniformly.

Embodiment 6

This embodiment provides a preparation method of polymer microspheres, including the following steps:

(1) Preparation of Polymer Microspheres:

Sequentially weigh 20 g acrylamide, 3 g sodium methallylsulfonate, 0.5 g ethylene glycol dimethacrylate, 5 g hydrophobic $TiO_2$ and 0.045 g ammonium persulfate; add them to a beaker with 70 g distilled water to generate a mixed liquor; stir the mixed liquor at 10000 r/min for 150 s to generate a dry-powdered mixture; place the dry-powdered mixture in a 65° C. water bath for polymerization for 3 h to obtain polymer microspheres.

(2) Preparation of Dispersion System:

Sequentially weigh 0.3 g polymer microspheres prepared in step (1), 0.15 g sodium dodecylbenzene sulfonate and 0.08 g glycerol; add them to 100 g water, stir and disperse uniformly.

Embodiment 7

This embodiment provides a preparation method of polymer microspheres, including the following steps:

(1) Preparation of Polymer Microspheres:

Sequentially weigh 5 g acrylamide, 2 g acrylic acid, 5 g dimethyl diallyl ammonium chloride, 0.7 g polyethylene glycol diacrylate (PEGDA 200), 6 g hydrophobic $TiO_2$ and 0.1 g 2,2'-azobis[2-methylpropionamidine] dihydrochloride; add them to a beaker with 75 g distilled water to generate a mixed liquor; stir the mixed liquor at 15000 r/min for 50 s to generate a dry-powdered mixture; place the dry-powdered mixture in a 65° C. water bath for polymerization for 2 h to obtain polymer microspheres.

(2) Preparation of Dispersion System:

Sequentially weigh 0.3 g polymer microspheres prepared in step (1), 0.25 g APG1214 and 0.05 g n-octanol; add them to 100 g water, stir and disperse uniformly.

Comparative Example 1

This comparative example uses commercially available microspheres, purchased from Dongying Baiyang Petroleum Technology Co., Ltd.

Performance Tests:

(1) The particle sizes of the profile control and oil displacement agents of Embodiments 1 to 7 and Comparative Example 1 were tested respectively, and the statistical results are shown in Table 1 below:

TABLE 1

Particle size test results

| Test objects | Particle size range (μm) | Average particle size (μm) |
|---|---|---|
| Embodiment 1 | 0.72-83.5 | 18.2 |
| Embodiment 2 | 0.64-98.6 | 23.6 |
| Embodiment 3 | 0.63-126.7 | 38.5 |
| Embodiment 4 | 0.62-146.8 | 28.8 |
| Embodiment 5 | 0.55-65.4 | 18.2 |
| Embodiment 6 | 0.62-104.3 | 26.7 |
| Embodiment 7 | 0.96-158.5 | 42.6 |
| Comparative Example 1 | 0.63-74.8 | 10.6 |

(2) Swelling Ratio Test

Figure 2:
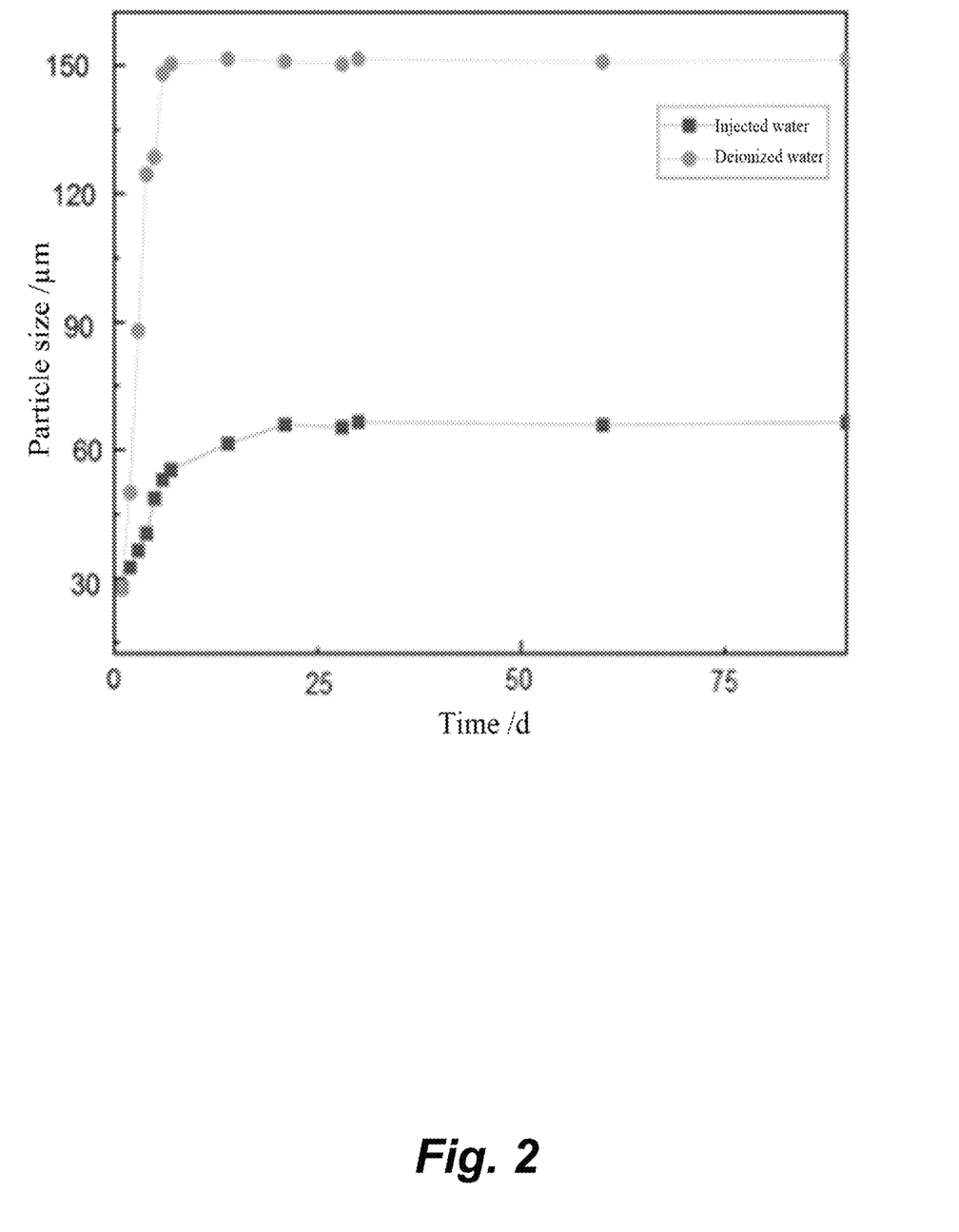
FIG. 2 shows water swelling changes of deep profile control and oil displacement systems of Embodiment 1 formed in deionized water and injected water.

The stability and swelling ratio of the profile control and oil displacement agents prepared in Embodiments 1 to 4 and Comparative Example 1 were tested by using deionized water and injected water (see Table 2 for composition analysis) of Changqing Oilfield as solvents. The swelling ratio is a coefficient when the water absorption is saturated, and the aging temperature was 60° C. The results are shown in FIG. 2 and Table 3 respectively.

TABLE 2

Composition analysis of injected water of Changqing Oilfield

| Concentration of ions (mg/L) | | | | | | Total salinity | Water type |
|---|---|---|---|---|---|---|---|
| $K^+ + Na^+$ | $Ca^{2+}$ | $Mg^{2+}$ | $Cl^-$ | $SO_4^{2-}$ | $HCO_3^{2-}$ | | |
| 15211.7 | 425.61 | 63.63 | 35240.5 | 101 | 116.9 | 59980 | Calcium chloride |

TABLE 3

Swelling ratio test results

| | Swelling ratio | |
|---|---|---|
| Test objects | Deionized water | Injected water |
| Embodiment 1 | 8.3 | 3.8 |
| Embodiment 2 | 13.6 | 5.4 |
| Embodiment 3 | 10.7 | 4.9 |
| Embodiment 4 | 7.8 | 3.6 |
| Comparative Example 1 | 7.1 | 2.5 |

Table 3 shows that at the aging temperature of 60° C., compared with Comparative Example 1, the profile control and oil displacement agents of Embodiments 1 to 4 have a larger swelling ratio when reaching saturation of water absorption in the injected water.

(3) Stability Test

The profile control and oil displacement agents prepared in Embodiments 1 to 4 and Comparative Example 1 were aged at 80° C. for 180 d in deionized water and injected water of Changqing Oilfield to examine their long-term stability. The results are shown in FIG. 3.

Figure 3:
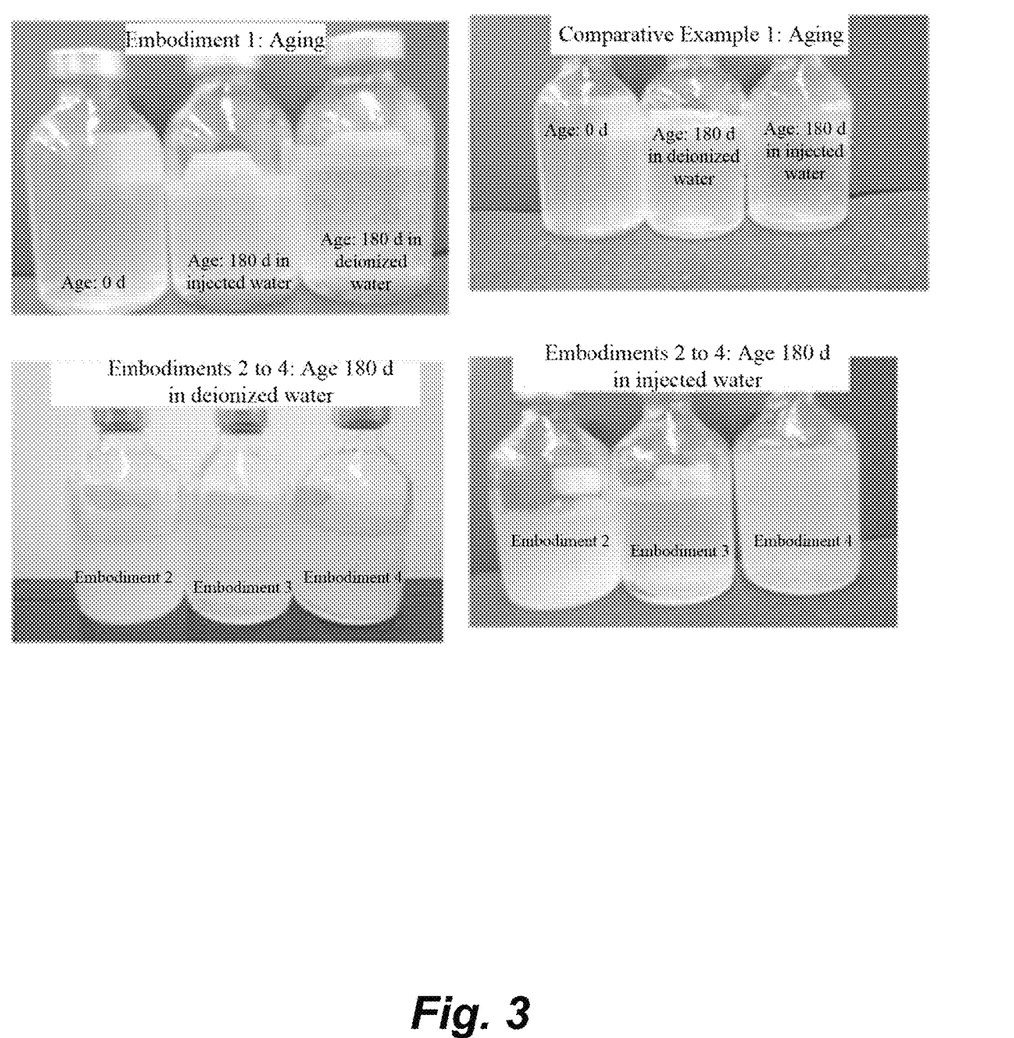
FIG. 3 shows comparisons of aging stability of deep profile control and oil displacement systems of Embodiments 1 to 4 and Comparative Example 1 formed in deionized water and injected water.

As shown in FIG. 3, after 180 d of aging, the microspheres of Comparative Example 1 had good stability in the deionized water, but it flocculated in the injected water, showing poor stability. The profile control and oil displacement systems formed by the profile control and oil displacement agents of Embodiments 1 to 4 in the injected water or deionized water all became slightly turbid after aging. In the profile control and oil displacement system formed in the deionized water, the polymer microspheres were swollen and clearly uniformly dispersed, but there was no precipitation or stratification in the entire system, indicating that the deep profile control and oil displacement system had good long-term stability.

(4) Oil-Water Interfacial Tension Test

Figure 4:
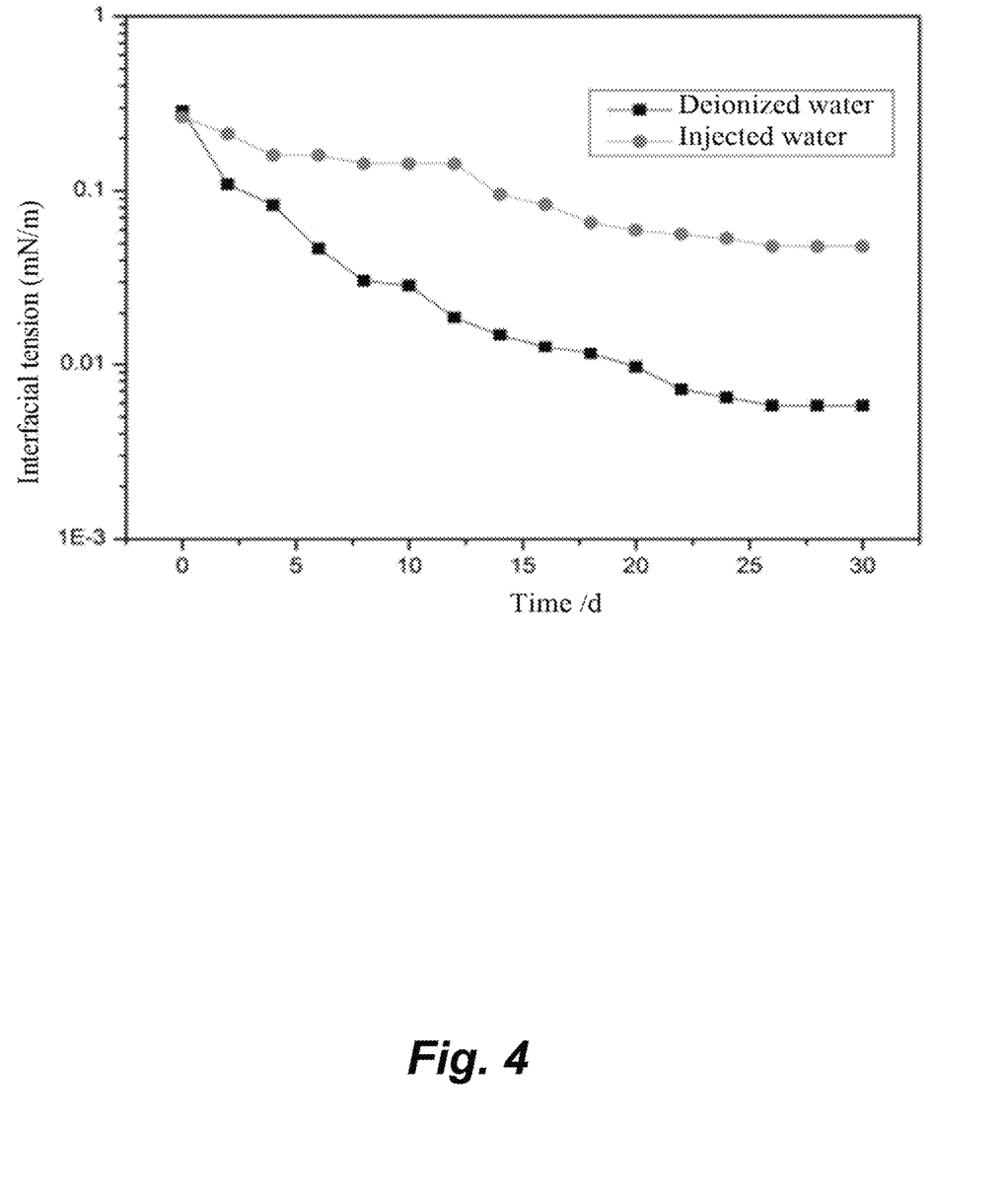
FIG. 4 shows dynamic water-oil interfacial tension changes of the deep profile control and oil displacement systems of Embodiment 1 formed in deionized water and injected water.

The interfacial tension between the profile control and oil displacement agents of Embodiments 1 to 4 and Comparative Example 1 and crude oil (Changqing Oilfield) was tested at 80° C. in the deionized water and injected water (see Table 2 for composition analysis) to investigate the ability of the agents to reduce the oil-water interfacial tension. The data in Table 4 is the interfacial tension at steady state, and the results are shown in FIG. 4 (Embodiment 1) and Table 4.

TABLE 4

Oil-water interfacial tension test results

| | Oil-water interfacial tension (mN/m) | |
|---|---|---|
| Test objects | Deionized water | Injected water |
| Embodiment 1 | 0.006 | 0.05 |
| Embodiment 2 | 0.001 | 0.02 |
| Embodiment 3 | 0.008 | 0.08 |
| Embodiment 4 | 0.005 | 0.04 |
| Comparative Example 1 | 0.28 | 1.25 |

FIG. 4 shows that the oil-water interfacial tension of Embodiment 1 decreases continuously and tends to be stable eventually with the prolonging of time.

Table 4 shows that compared with Comparative Example 1, the deep profile control and oil displacement systems formed by the profile control and oil displacement agents of Embodiments 1 to 4 in the deionized water reduce the oil-water interfacial tension to below $10^{-3}$. The final stable oil-water interfacial tension of the profile control and oil displacement agent of Embodiment 1 is 0.001 mN/m. The profile control and oil displacement systems formed in the injected water reduce the oil-water interfacial tension to below $10^{-2}$. The ability of these profile control and oil displacement agents to reduce the oil-water interfacial tension is better than that of Comparative Example 1. Therefore, these deep profile control and oil displacement systems have a better ability to reduce the oil-water interfacial tension.

(5) Plugging Rate and Recovery Efficiency Test

A double-pipe parallel test was carried out to test the plugging performance and recovery factor of the profile control and oil displacement agents of Embodiments 1 to 4 and the microspheres of Comparative Example 1.

Specifically, the test includes: select a series of artificial cores and measure their basic physical parameters; calculate porosity; measure permeability with water; respectively saturate with oil; perform primary waterflooding after parallel connection; calculate a waterflooding recovery factor; inject the profile control and oil displacement agent with microspheres; perform secondary waterflooding after aging at 60° C. for 7 d; and calculate the plugging rate and recovery factor. The microsphere concentration was 0.2%, the injection volume was 0.4 PV, and the injection rate was 1 mL/min. The statistical results are shown in Table 5.

TABLE 5

Waterflooding recovery factor test results

| Type | Core permeability/ $10^{-3}$ μm$^2$ | Breakthrough pressure/MPa | Plugging rate/% | Primary waterflooding recovery factor/% | Microsphere flooding recovery factor/% | Secondary waterflooding recovery factor/% | Recover factor increase/% |
|---|---|---|---|---|---|---|---|
| Embodiment 1 | 60.6 726.9 | 3.42 | 6.2 85.3 | 1.2 50.3 | 1.6 17.3 | 25.4 4.6 | 27 21.9 |
| Embodiment 2 | 67.8 776.8 | 3.15 | 7.1 89.9 | 2.6 52.4 | 1.3 16.5 | 26.3 5.7 | 27.6 22.2 |
| Embodiment 3 | 62.6 746.4 | 3.35 | 5.6 89.4 | 1.9 51.7 | 1.8 14.4 | 25.6 6.9 | 27.4 21.3 |
| Embodiment 4 | 72.8 805.4 | 3.08 | 5.8 87.6 | 0.8 49.8 | 2.4 18.7 | 21.3 4.9 | 23.7 23.6 |
| Comparative Example 1 | 67.8 796.5 | 2.06 | 5.7 70.7 | 1.8 51.6 | 0.7 5.6 | 15.8 5.5 | 16.5 11.1 |

Table 5 shows that the profile control and oil displacement agents of Embodiments 1 to 4 have higher breakthrough pressures than that of Comparative Example 1, and their plugging rate in a high-permeability layer is above 85%, while the plugging rate of Comparative Example 1 in the high-permeability layer is only 70.7%. This shows that the profile control and oil displacement agents of Embodiments 1 to 4 have excellent plugging performance.

In addition, the pure flooding recovery factor and total recovery factor increases of Embodiments 1 to 4 are higher than those of Comparative Example 1, indicating that the profile control and oil displacement agents of Embodiments 1 to 4 have better oil displacement effects. This is because these profile control and oil displacement agents have a better ability to reduce the oil-water interfacial tension and a better oil stripping effect.

The technical features of the above embodiments may be combined arbitrarily. In order to make the description of the embodiments concise, it is impossible to describe all possible combinations of the technical features of the embodiments. However, all possible combinations of the technical features should be understood as falling within the scope of the present disclosure as long as no contradiction occurs.

The above described are merely preferred embodiments of the present disclosure, which are not intended to limit the present disclosure. Any modifications, equivalent replacements and improvements made within the spirit and principle of the present disclosure should be included in the protection scope of the present disclosure.

What is claimed is:

1. A profile control and oil displacement agent for an oil reservoir, which is prepared by uniformly dispersing components by weight percent as follows:
   0.2-1.0% polymer microspheres;
   0.2-0.5% activator; and
   a balance being a dispersant;
   wherein, the polymer microspheres are prepared by stirring and polymerizing raw materials in part by weight as follows: 10-40 parts of first monomer, 0.05-1.2 parts of second monomer, 0.03-1.5 parts of initiator, 1-12 parts of hydrophobic nano-powder and 65-85 parts of water; the first monomer is selected from at least one of the group consisting of acrylamide monomer, allyl monomer, styrene monomer, itaconic acid and maleic anhydride; the second monomer is a crosslinking monomer.

2. The profile control and oil displacement agent for the oil reservoir according to claim 1, wherein the activator comprises a main activator and an auxiliary activator; the main activator is selected from at least one of the group consisting of alkyl polyglycoside, hydroxy-2-undecyl-1-carboxymethylimidazoline, sodium dodecylbenzene sulfonate and petroleum sulfonate; the auxiliary activator is selected from at least one of the group consisting of glycerol, isoamyl alcohol and octanol.

3. The profile control and oil displacement agent for the oil reservoir according to claim 2, wherein a weight ratio of the main activator to the auxiliary activator is (0.1-0.5):(0.01-0.08).

4. The profile control and oil displacement agent for the oil reservoir according to claim 1, wherein the hydrophobic nano-powder is selected from at least one of the group consisting of hydrophobic nano-SiO$_2$ and hydrophobic nano-TiO$_2$.

5. The profile control and oil displacement agent for the oil reservoir according to claim 1, wherein the first monomer is selected from at least one of the group consisting of acrylamide, 2-methyl-2-acrylamido-propanesulfonic acid, sodium methallylsulfonate, methacryloxyethyl trimethyl ammonium chloride, sodium p-styrene sulfonate, dimethyl diallyl ammonium chloride, itaconic acid, acrylic acid and maleic anhydride.

6. The profile control and oil displacement agent for the oil reservoir according to claim 1, wherein the second monomer is selected from at least one of the group consisting of N,N-methylenebisacrylamide, divinylbenzene, 1,4-butanediol dimethacrylate, ethylene glycol dimethacrylate and polyethylene glycol diacrylate.

7. The profile control and oil displacement agent for the oil reservoir according to claim 1, wherein the initiator is selected from at least one of the group consisting of ammonium persulfate, sodium persulfate, potassium persulfate, sodium thiosulfate, sodium bi sulfite and 2,2'-azobis[2-methylpropionamidine] dihydrochloride.

8. The profile control and oil displacement agent for the oil reservoir according to claim 2, wherein the hydrophobic nano-powder is selected from at least one of the group consisting of hydrophobic nano-SiO2 and hydrophobic nano-TiO2.

9. The profile control and oil displacement agent for the oil reservoir according to claim 3, wherein the hydrophobic nano-powder is selected from at least one of the group consisting of hydrophobic nano-SiO2 and hydrophobic nano-TiO2.

10. The profile control and oil displacement agent for the oil reservoir according to claim 2, wherein the first monomer is selected from at least one of the group consisting of acrylamide, 2-methyl-2-acrylamido-propanesulfonic acid, sodium methallylsulfonate, methacryloxyethyl trimethyl ammonium chloride, sodium p-styrene sulfonate, dimethyl diallyl ammonium chloride, itaconic acid, acrylic acid and maleic anhydride.

11. The profile control and oil displacement agent for the oil reservoir according to claim 3, wherein the first monomer is selected from at least one of the group consisting of acrylamide, 2-methyl-2-acrylamido-propanesulfonic acid, sodium methallylsulfonate, methacryloxyethyl trimethyl ammonium chloride, sodium p-styrene sulfonate, dimethyl diallyl ammonium chloride, itaconic acid, acrylic acid and maleic anhydride.

12. The profile control and oil displacement agent for the oil reservoir according to claim 2, wherein the second monomer is selected from at least one of the group consisting of N,N-methylenebisacrylamide, divinylbenzene, 1,4-butanediol dimethacrylate, ethylene glycol dimethacrylate and polyethylene glycol diacrylate.

13. The profile control and oil displacement agent for the oil reservoir according to claim 3, wherein the second monomer is selected from at least one of the group consisting of N,N-methylenebisacrylamide, divinylbenzene, 1,4-butanediol dimethacrylate, ethylene glycol dimethacrylate and polyethylene glycol diacrylate.

14. The profile control and oil displacement agent for the oil reservoir according to claim 2, wherein the initiator is selected from at least one of the group consisting of ammonium persulfate, sodium persulfate, potassium persulfate, sodium thiosulfate, sodium bi sulfite and 2,2'-azobis[2-methylpropionamidine] dihydrochloride.

15. The profile control and oil displacement agent for the oil reservoir according to claim 3, wherein the initiator is selected from at least one of the group consisting of ammonium persulfate, sodium persulfate, potassium persulfate, sodium thiosulfate, sodium bi sulfite and 2,2'-azobis[2-methylpropionamidine] dihydrochloride.

* * * * *